(12) United States Patent
Kuo et al.

(10) Patent No.: US 10,485,089 B2
(45) Date of Patent: Nov. 19, 2019

(54) HELICAL PERMANENT MAGNET STRUCTURE AND UNDULATOR USING THE SAME

(71) Applicant: NATIONAL SYNCHROTRON RADIATION RESEARCH CENTER, Hsinchu (TW)

(72) Inventors: Cheng-Ying Kuo, Hsinchu (TW); Cheng-Hsing Chang, Hsinchu (TW); Cheng-Hsiang Chang, Hsinchu (TW)

(73) Assignee: NATIONAL SYNCHROTRON RADIATION RESEARCH CENTER, Hsinchu (TW)

(*) Notice: Subject to any disclaimer, the term of this patent is extended or adjusted under 35 U.S.C. 154(b) by 149 days.

(21) Appl. No.: 15/697,481

(22) Filed: Sep. 7, 2017

(65) Prior Publication Data

US 2019/0075646 A1    Mar. 7, 2019

(51) Int. Cl.
| | |
|---|---|
| *H01F 5/00* | (2006.01) |
| *H05H 7/04* | (2006.01) |
| *H01F 7/02* | (2006.01) |
| *H05H 13/04* | (2006.01) |
| *H01S 3/09* | (2006.01) |

(52) U.S. Cl.
CPC .............. *H05H 7/04* (2013.01); *H01F 7/0278* (2013.01); *H05H 13/04* (2013.01); *H01S 3/0903* (2013.01)

(58) Field of Classification Search
CPC .. H05H 7/04; H05H 13/14; H01F 7/02; H01F 7/0278
USPC ........................................................ 335/229
See application file for complete search history.

(56) References Cited

U.S. PATENT DOCUMENTS

| | | | | |
|---|---|---|---|---|
| 4,461,004 A | * | 7/1984 | Madey ................... | H01S 3/0903 372/2 |
| 4,731,598 A | * | 3/1988 | Clarke ................... | H01F 7/0278 315/5.35 |
| 4,764,743 A | * | 8/1988 | Leupold ................ | H01F 7/0278 335/212 |
| 4,800,353 A | * | 1/1989 | Csonka ................. | H01F 7/0278 335/210 |
| 4,829,277 A | * | 5/1989 | Stahura ................ | G01R 33/383 148/301 |
| 4,876,687 A | * | 10/1989 | Feinstein .............. | H01S 3/0903 372/2 |

(Continued)

OTHER PUBLICATIONS

H.-D. Nuhn—Commissioning of the Delta Polarizing Undulator at LCLS—Presented at the 37th International Free-Electron-Laser Conference (FEL15), Daejeon Korea SLAC National Accelerator Laboratory, 2575 Sand Hill Road, Menlo Park, CA 94025; 7 pgs.

*Primary Examiner* — Shawki S Ismail
*Assistant Examiner* — Lisa N Homza
(74) *Attorney, Agent, or Firm* — Schmeiser, Olsen & Watts, LLP

(57) ABSTRACT

A helical permanent magnet structure includes at least one magnet assembly. The magnet assembly includes a plurality of permanent magnets and poles. The permanent magnets are with a magnetization direction, and formed as helical shape and arranged as a helical surface, the center of the helical surface has a longitudinal passage for being passed through by a charged particle. The poles are with the same amount of the permanent magnets, wherein the poles are magnetized by the permanent magnets and absorb on one side of the permanent magnets.

14 Claims, 11 Drawing Sheets

(56) References Cited

U.S. PATENT DOCUMENTS

| | | | | |
|---|---|---|---|---|
| 4,893,103 | A * | 1/1990 | Leupold | H01F 6/00 315/5.35 |
| 4,977,384 | A * | 12/1990 | Tatchyn | H01F 7/0278 315/5.35 |
| 5,010,640 | A * | 4/1991 | Gottschalk | H01S 3/0903 29/602.1 |
| 5,014,028 | A * | 5/1991 | Leupold | H01F 7/0278 315/3.5 |
| 5,019,863 | A * | 5/1991 | Quimby | H01F 7/0278 315/5.35 |
| RE33,736 | E * | 11/1991 | Clarke | H01F 7/0278 315/5.35 |
| 5,099,175 | A * | 3/1992 | Schlueter | H05H 7/04 315/3 |
| 5,099,217 | A * | 3/1992 | Leupold | H05H 7/04 315/5.35 |
| 5,280,209 | A * | 1/1994 | Leupold | H02K 1/278 310/156.41 |
| 5,332,971 | A * | 7/1994 | Aubert | G01R 33/383 324/302 |
| 5,383,049 | A * | 1/1995 | Carr | H05G 2/00 359/283 |
| 5,563,568 | A * | 10/1996 | Sasaki | H01F 7/0278 315/5.35 |
| 5,565,747 | A * | 10/1996 | Sasaki | H01F 7/0284 315/503 |
| 5,596,304 | A * | 1/1997 | Tatchyn | H01F 7/0278 335/210 |
| 5,635,889 | A * | 6/1997 | Stelter | H01F 7/0278 335/306 |
| 5,666,098 | A * | 9/1997 | Leupold | H01F 7/0278 315/5.34 |
| 6,573,817 | B2 * | 6/2003 | Gottschalk | H05H 7/04 335/302 |
| 6,858,998 | B1 * | 2/2005 | Shenoy | H05H 13/04 315/501 |
| 8,368,033 | B2 * | 2/2013 | Lane | H01J 27/00 250/423 P |
| 8,638,016 | B2 * | 1/2014 | Fullerton | H02K 21/24 310/156.35 |
| 8,704,626 | B2 * | 4/2014 | Fullerton | H01F 7/0247 335/285 |
| 8,760,251 | B2 * | 6/2014 | Roberts | H01F 7/0284 335/207 |
| 8,963,380 | B2 * | 2/2015 | Fullerton | H02K 21/24 310/12.12 |
| 9,093,208 | B2 * | 7/2015 | Muller | H01F 7/0278 |
| 9,245,677 | B2 * | 1/2016 | Fullerton | H01F 7/0221 |
| 9,330,825 | B2 * | 5/2016 | Sarai | H01F 7/02 |
| 9,711,268 | B2 * | 7/2017 | Fullerton | E05C 19/16 |
| 10,173,292 | B2 * | 1/2019 | Fullerton | B23P 15/001 |
| 2013/0130914 | A1 * | 5/2013 | Boffo | G21K 1/093 505/211 |
| 2014/0048707 | A1 * | 2/2014 | Liu | H05H 13/04 250/310 |
| 2015/0129772 | A1 * | 5/2015 | Candler | H05H 7/04 250/396 ML |
| 2016/0064129 | A1 * | 3/2016 | Gluskin | H01F 7/0231 335/306 |
| 2017/0093113 | A1 * | 3/2017 | Musumeci | H01S 3/0903 |
| 2017/0184975 | A1 * | 6/2017 | Nikipelov | G03F 7/70008 |
| 2017/0339777 | A1 * | 11/2017 | Kinjo | H05H 13/04 |
| 2019/0080828 | A1 * | 3/2019 | Yamamoto | H01F 7/0278 |

* cited by examiner

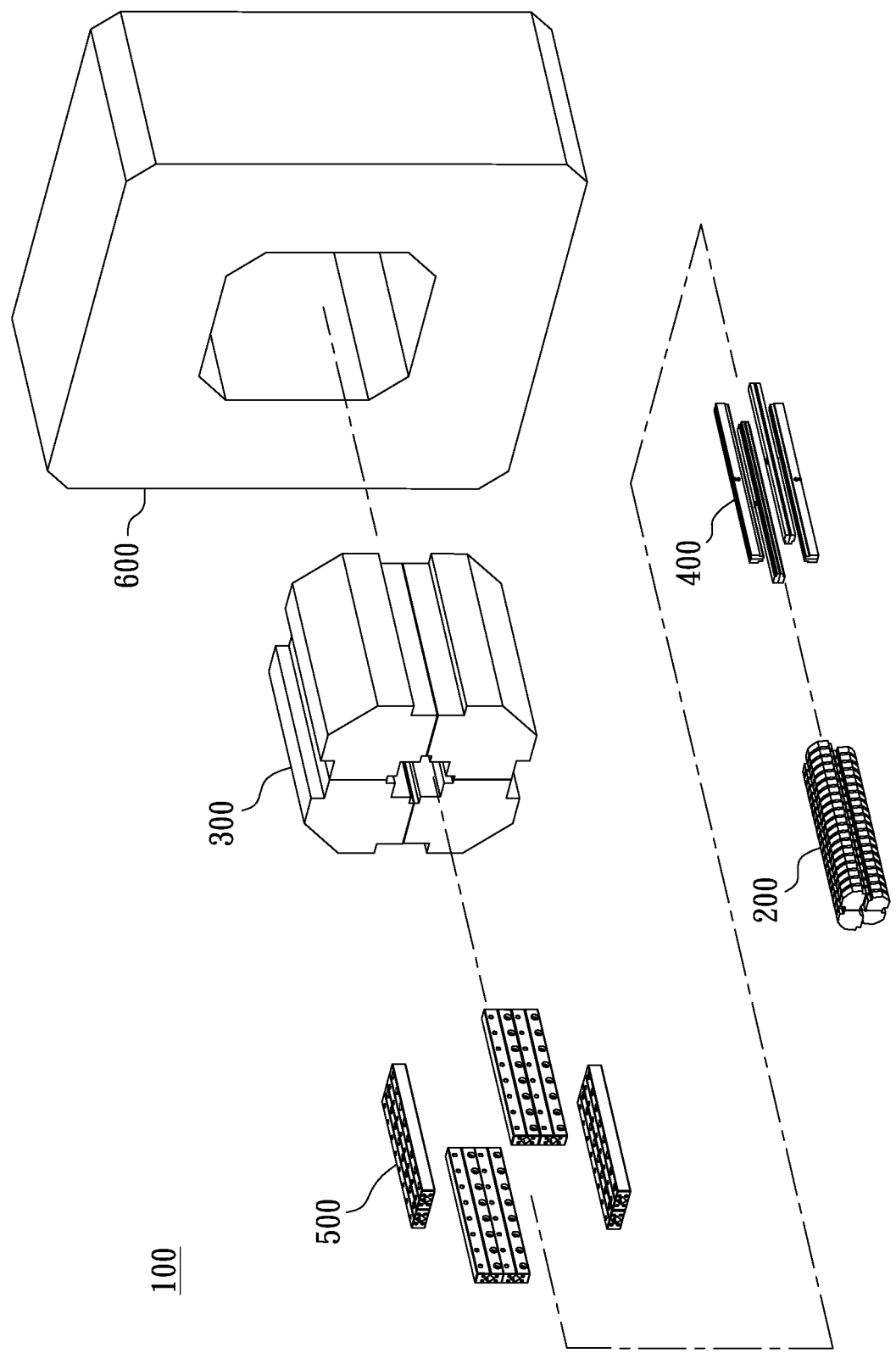

HELICAL PERMANENT MAGNET STRUCTURE AND UNDULATOR USING THE SAME

FIELD OF THE INVENTION

The present invention relates to a permanent magnet structure and undulator using the same, and in particular to a helical permanent magnet structure and undulator using the same.

BACKGROUND OF THE INVENTION

An undulator is developed in modern times and has been widely applied to various fields, such as radiation experiment, solid state physics, biology and medical science. Nowadays, other applications for new uses of the undulator is still being researched.

Linear Accelerator is one type of the undulators in early days, in which an electric field occurs through several field generators arranged in line, e.g., electrode collar, so as to accelerate the charged particle continuingly by changing the electric property of the surface of the electric field. However, with the charged particle becomes faster and faster, the field generators must keep high voltage during the acceleration process, it leads not only the high cost but also the risk of safety. In addition, the electric charges exist on the surface of the high-voltage electric field may increase the interference to the charged particle. Further, in terms of the linear accelerators, the length of the path of the charged particle is decided by the length of the field generators, the features results in the linear accelerator with huge size so a waste of space.

Another type of the undulators is Synchrotron, such as a polarizing undulator published by SLAC National Accelerator Laboratory of Stanford University in 2014 (COMMISSIONING OF THE DELTA POLARIZING UNDULATOR AT LCLS, SLAC-PUB-16404), in which the charged particle is acted by a helical magnetic field and an electric field simultaneously so that to move helically in the undulator. Therefore, the path of the charged particle can be extended in the same linear distance.

However, the mentioned helical magnetic field is simulated by four magnetic fields in X-Y plane which are generated by the magnet assemblies set around the charged particle in four directions. Hence, the efficiency of polarization and the magnetic strength are both lower than real helical magnetic field. Moreover, the magnet structure causes the limitation in space to the four magnet assemblies, as a result, the lower uniformity of whole of the magnet field takes a toll on the application of the undulator.

SUMMARY OF THE INVENTION

According to one aspect of the present disclosure, a helical permanent magnet structure includes at least one magnet assembly. The magnet assembly includes a plurality of permanent magnets and poles. The permanent magnets are with a magnetization direction, and formed as helical shape and arranged as a helical surface, the center of the helical surface has a longitudinal passage for being passed through by a charged particle. The poles are with the same amount of the permanent magnets, wherein the poles are magnetized by the permanent magnets and absorb on one side of the permanent magnets.

According to another aspect of the present disclosure, an undulator includes the helical permanent magnet structure of the aspect as mentioned above.

BRIEF DESCRIPTION OF THE DRAWINGS

FIG. 1 is an exploded view of a helical permanent magnet structure according to one embodiment of the present disclosure;

DETAILED DESCRIPTION OF THE PREFERRED EMBODIMENTS

To make it easier for the examiner to understand the objects, characteristics and effects of this invention, we use a preferred embodiment together with the attached drawings for the detailed description of the present disclosure.

Figure 2A:
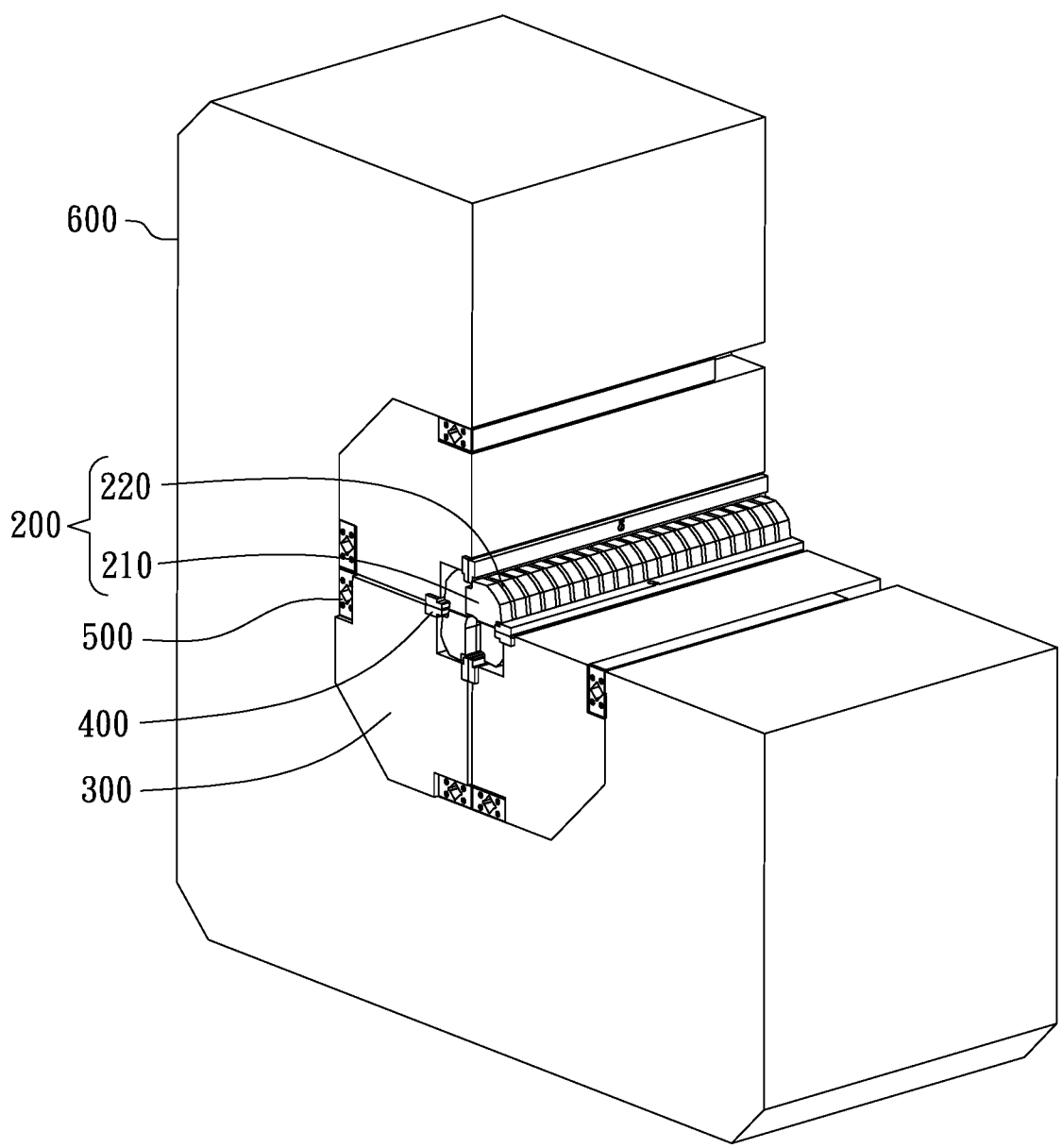
FIG. 2A is a cross-sectional view of the helical permanent magnet structure of FIG. 1.
Figure 2B:
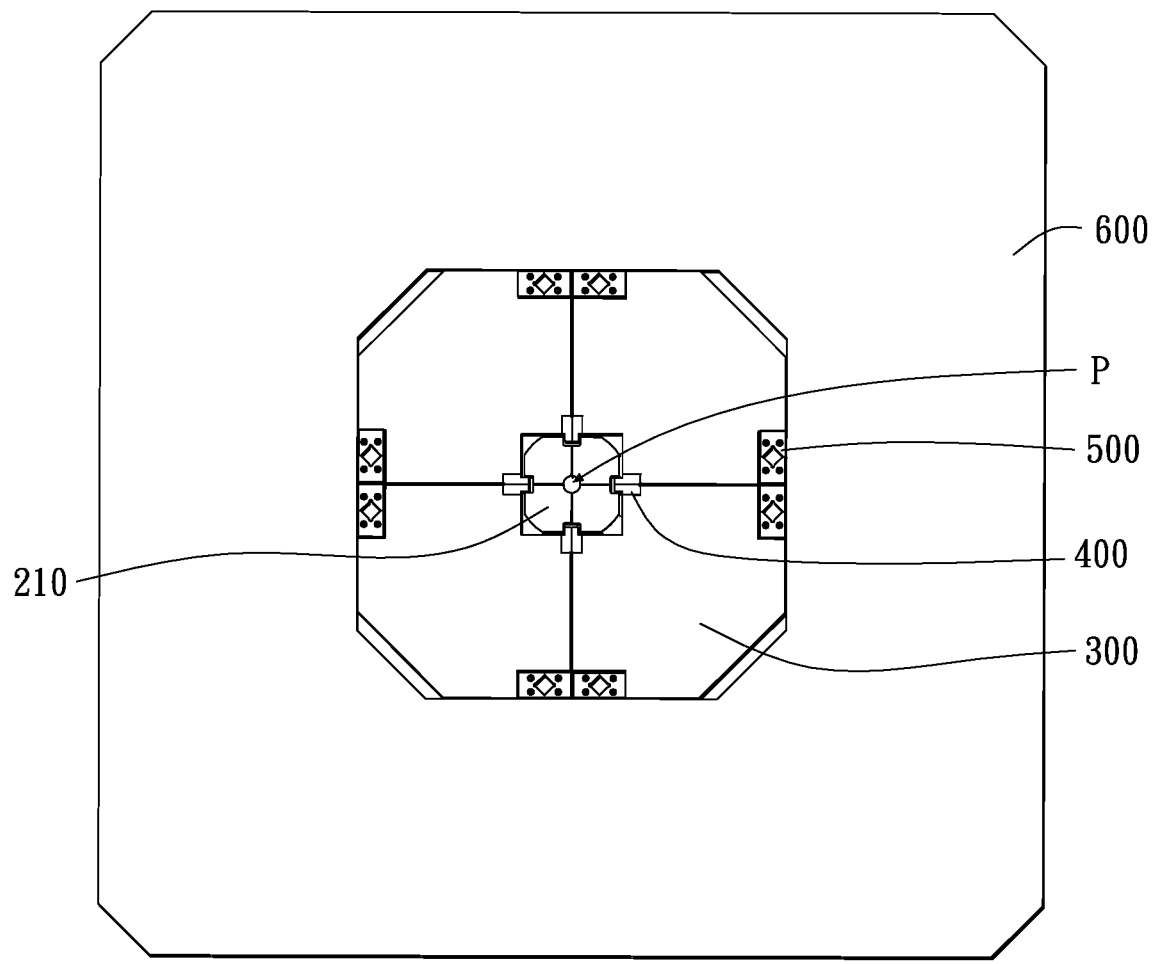
FIG. 2B is a front view of the helical permanent magnet structure of FIG. 1.

With reference to FIG. 1, FIG. 2A and FIG. 2B for a exploded view, a cross-sectional view and a front view of the present disclosure respectively, a helical permanent magnet structure 100 includes a plurality of magnet assemblies 200, an inner frame 300, a plurality of positioning members 400, a plurality of guiding members 500 and an outer frame 600. In FIG. 2A, each of the magnet assemblies 200 includes a plurality of permanent magnets 210 and poles 220, the permanent magnets 210 and poles 220 are combined in series and as cylindrical shape, and limited by the surrounded inner frame 300. A plurality of recesses which correspond to the shape of the guiding members 500 are disposed on the outside of the inner frame 300. The guiding members 500 are fixedly disposed on the outer frame 600, thereby the inner frame 300 can be moved longitudinally relative to the outer frame 600.

To overcome the magnetic force between each of the magnet assemblies 200, a plurality of recesses, corresponded to the shape of the positioning member 400, are disposed on the outside of each of the permanent magnets 210 and each of the poles 220. Consequently, each of the magnet assembly 200 can be aligned accurately by positioning the permanent magnet 210 and the pole 220 with the positioning member 400.

As shown in FIG. 2B, the size of the inner frame 300 or the positioning members 400 and the relative distance thereof are variable to alter the gap between each of the permanent magnets 210, so as to vary the magnetic strength of the helical permanent magnet structure 100.

Figure 3A:
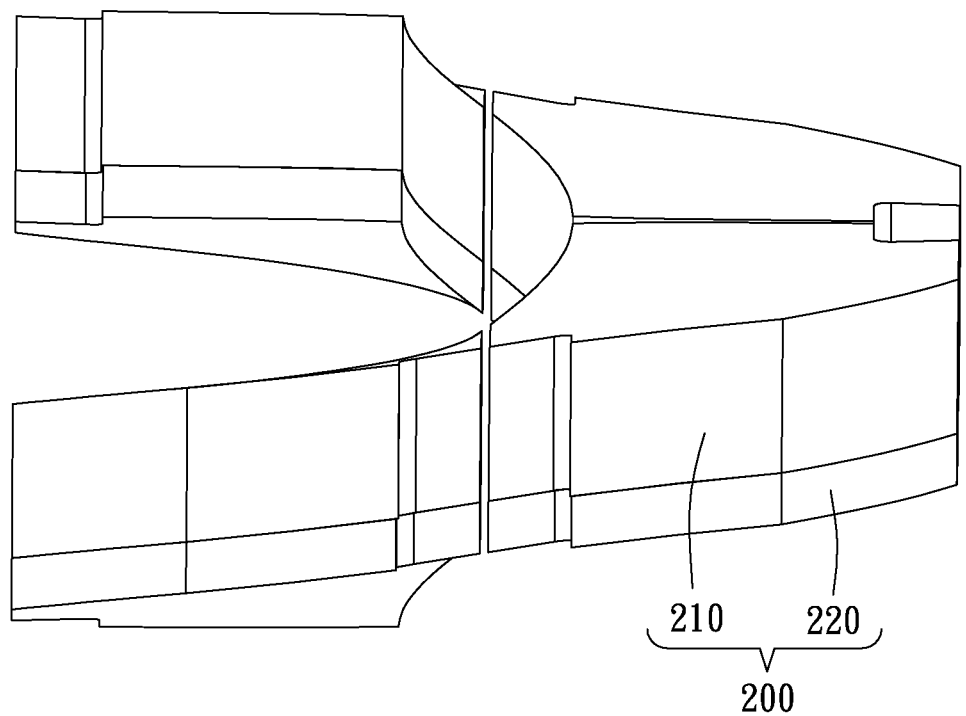
FIG. 3A is a schematic view of the magnet assembly of the helical permanent magnet structure of FIG. 1.

With reference to FIG. 3A for a schematic view of the magnet assembly 200 of the present disclosure, the minimum unit of the helical permanent magnet structure 100 is single of the magnet assemblies 200. The magnet assembly 200 includes four of the permanent magnets 210 and the poles 220, each of the poles 220 absorbs on one side of the corresponded permanent magnet 210. Four of the permanent magnets 210 and the poles 220 compose a helical surface, and the center of the helical surface has a longitudinal passage for being passed through by a charged particle. It is remarkable that both the permanent magnets 210 and the poles 220 can also be divided into different number of sectors, hence the number of the permanent magnets 210 and the pole 220 are not limited to four.

Figure 3B:
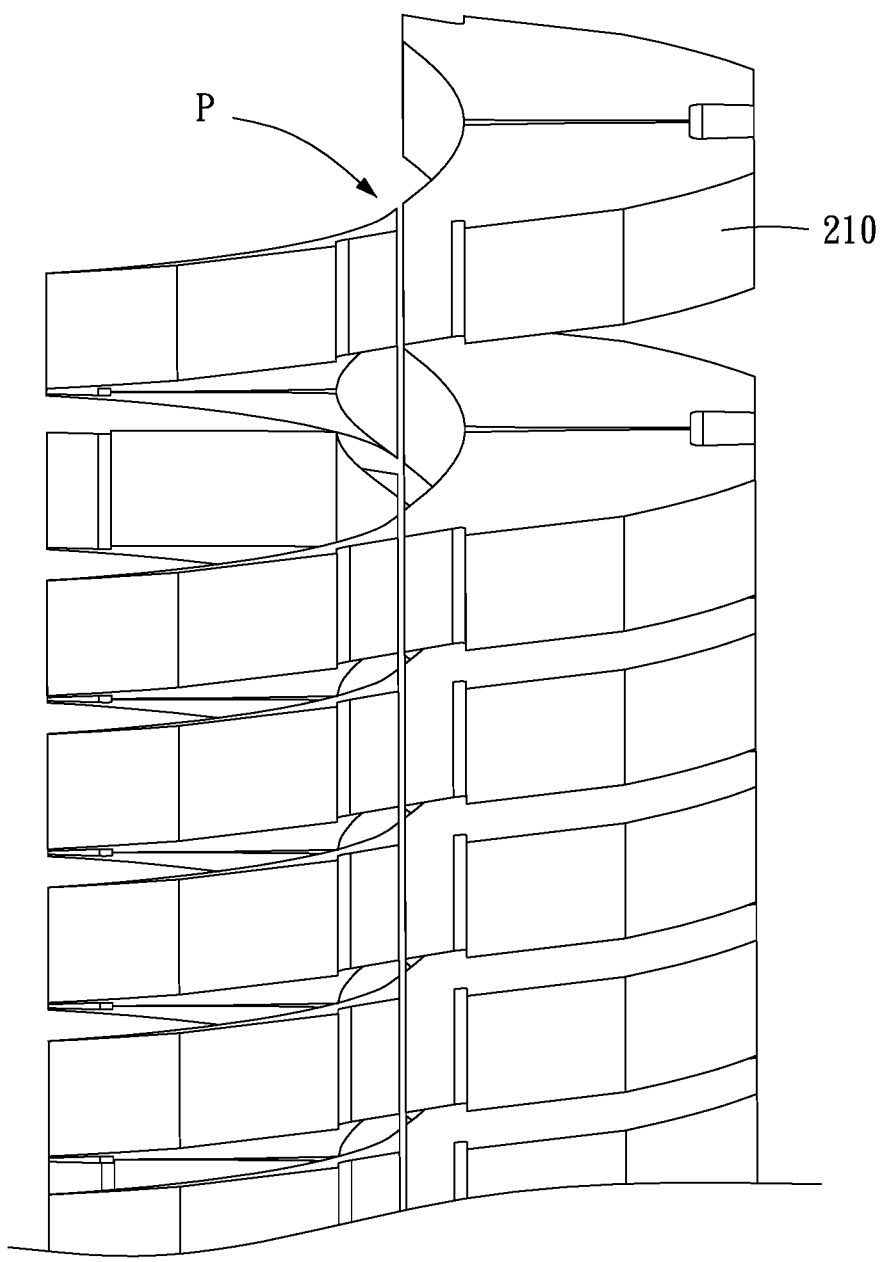
FIG. 3B is a schematic view of the permanent magnets of the helical permanent magnet structure of FIG. 1.
Figure 3C:
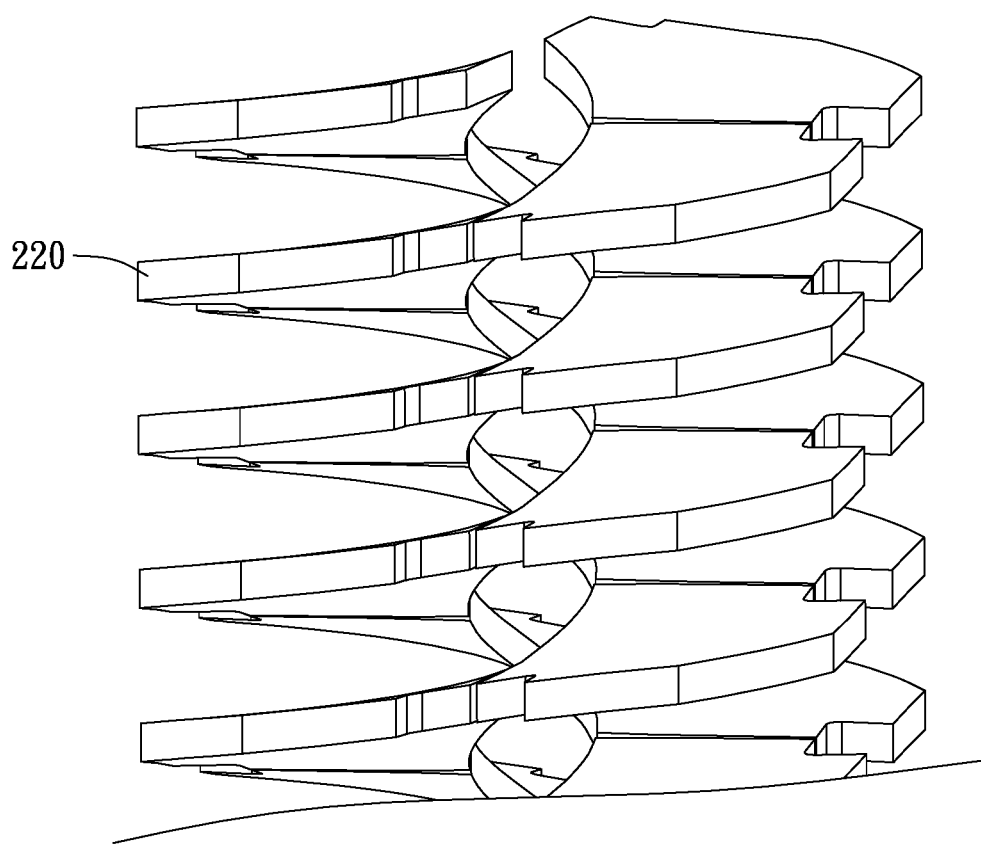
FIG. 3C is a schematic view of the poles of the helical permanent magnet structure of FIG. 1.

With reference to FIGS. 3B and 3C for a schematic view of the permanent magnets 210 and the poles 220 of the present disclosure, to explain the detail structure of the magnet assembly 200 precisely, FIG. 3B and FIG. 3C only show the permanent magnets 210 and the poles 220 respectively. In the embodiment of the present disclosure, the magnet assemblies 200 are interlaced with each other in a double helix, and a longitudinal passage P is formed in the center of the magnet assemblies 200. In addition, the magnet assemblies 200 can be combined in series to extend the longitudinal passage P as required.

Figure 4A:
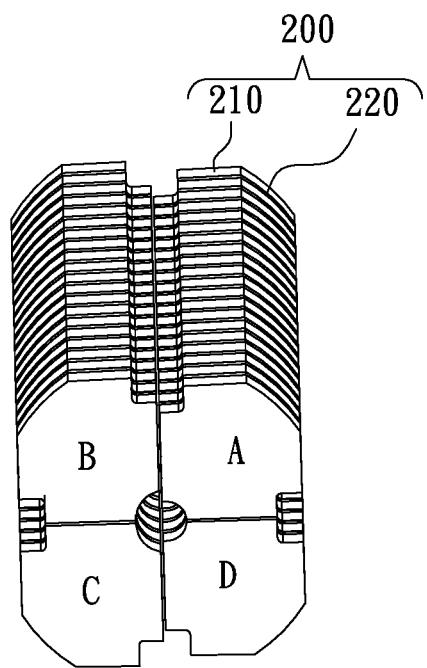
FIG. 4A is a schematic view of the magnet assembly of the helical permanent magnet structure.
Figure 4B:
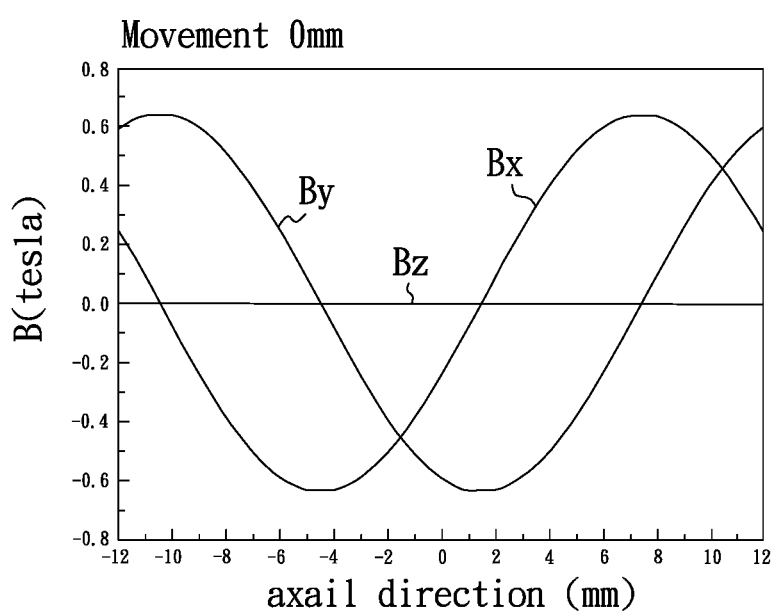
FIG. 4B is a schematic view of distribution of magnetic field of the magnet assembly of FIG. 4A.
Figure 5A:
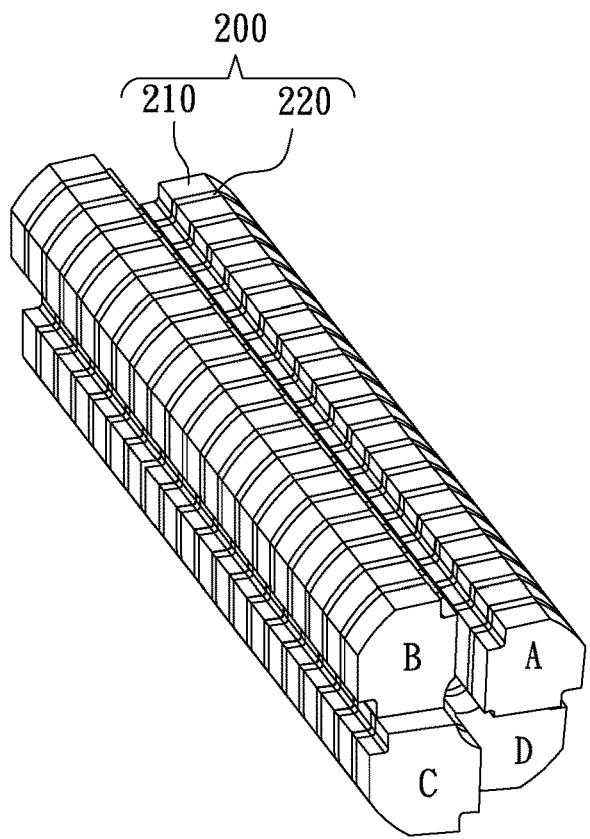
FIG. 5A is a schematic view of the magnet assembly of the helical permanent magnet structure.
Figure 5B:
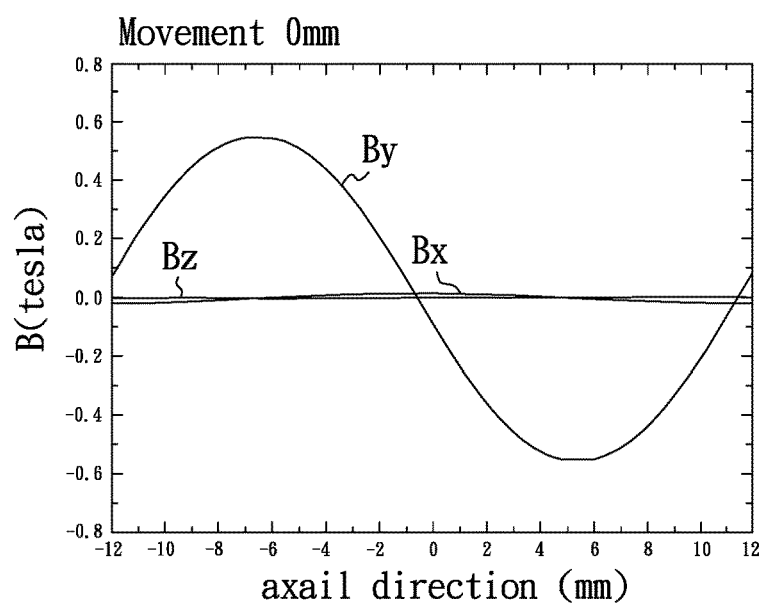
FIG. 5B is a schematic view of distribution of magnetic field of the magnet assembly of FIG. 5A.
Figure 6A:
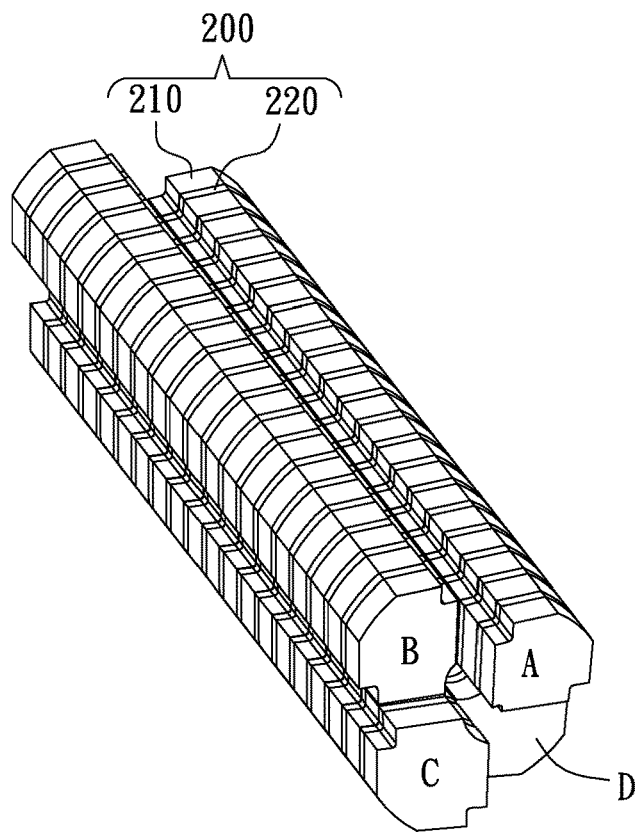
FIG. 6A is a schematic view of the magnet assembly of the helical permanent magnet structure.
Figure 6B:
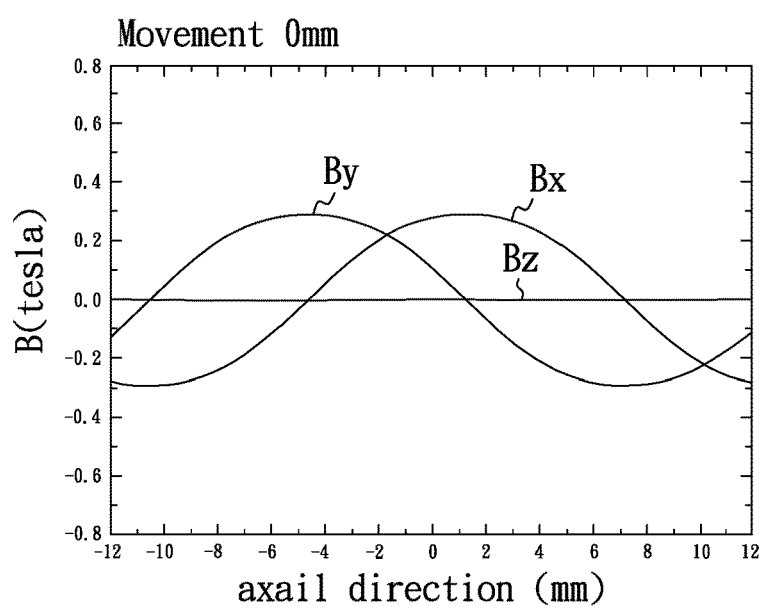
FIG. 6B is a schematic view of distribution of magnetic field of the magnet assembly of FIG. 6A.
Figure 7A:
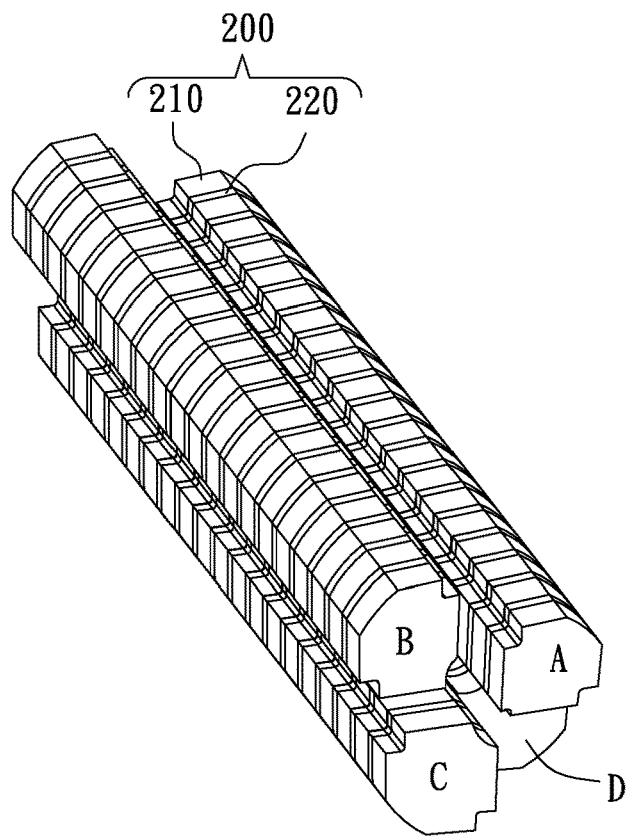
FIG. 7A is a schematic view of the magnet assembly of the helical permanent magnet structure.
Figure 7B:
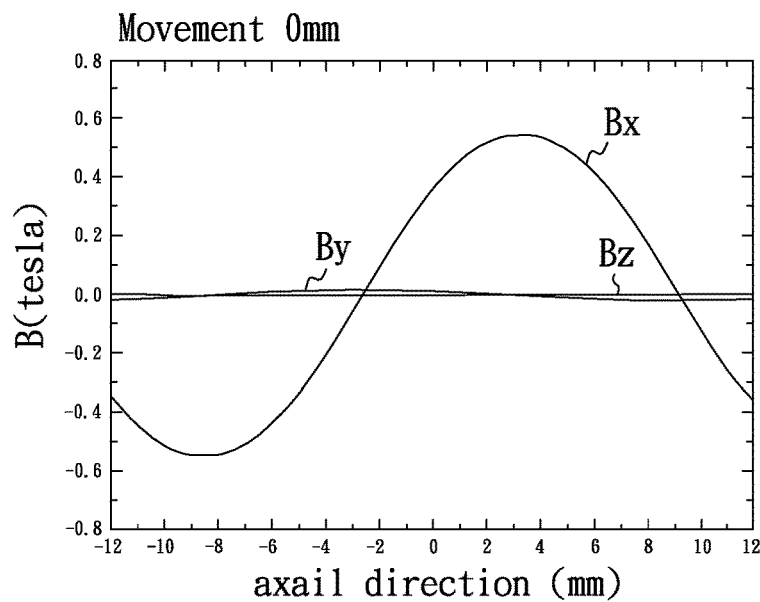
FIG. 7B is a schematic view of distribution of magnetic field of the magnet assembly of FIG. 7A.

With and 4B for a schematic view of the magnet assembly and the distribution of magnetic field of FIG. 4A, in normal state, the magnetic fields of the helical permanent magnet structure 100 in horizontal and transverse are equal in phase of 90 degree and both periodical. With reference to FIGS. 5A and 5B, since each of the magnet assemblies 200 is divided into four sectors numbered A, B, C and D, the magnetic phase of the helical permanent magnet structure 100 can be varied by moving the serial assembly longitudinally, so that to apply to different situations. As shown in FIG. 5A, when the assemblies A and C are longitudinally moved one third period (depending on the thickness of the permanent magnet 210 and pole 220, the period herein is 24 mm in the embodiment), under the circumstance, the helical permanent magnet structure 100 presents the magnetic field in only transverse direction. In FIGS. 6A and 6B, when the assemblies A and C are longitudinally moved one half period, the phase of the magnetic fields in horizontal and transverse directions are exchanged (compared to FIG. 4B), that is, the direction of rotation of the helical magnetic field are changed from clockwise to anti-clockwise. In FIGS. 7A and 7B, when the assemblies A and C are longitudinally moved two third period, the helical permanent magnet structure 100 presents the magnetic field in only horizontal direction. Moreover, the magnetic strength is adjustable by changing the width of the gap between each of the magnet assemblies 200 in radial direction.

Figure 8:
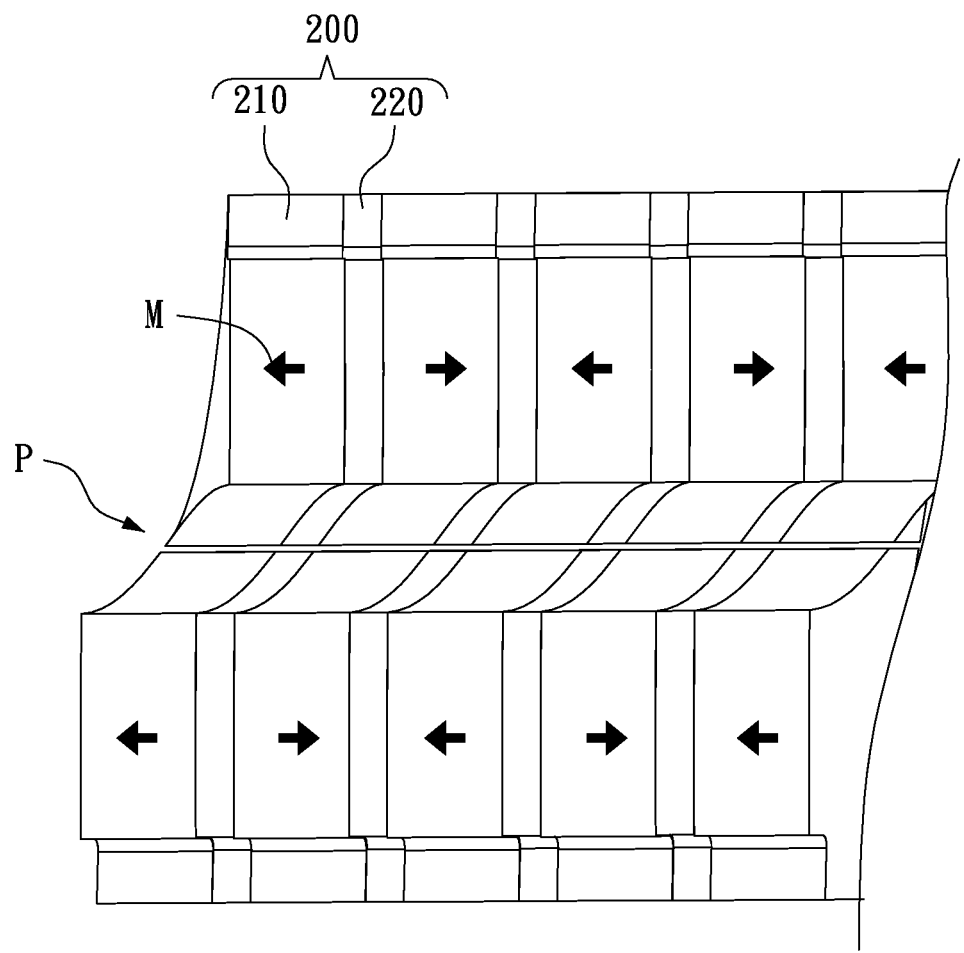
FIG. 8 is a schematic view of the magnetization direction of the helical permanent magnet structure of FIG. 1.

With reference to FIG. 8 for a schematic view of the magnetization direction of the present disclosure, because of the orthogonal magnetic fields in horizontal and transverse directions, the permanent magnets 210 of two of the magnet assemblies 200 which are interlaced with each other can be with reverse magnetization directions M. Therefore, the magnetic strength of the poles 220 can be twice when being magnetized. In the embodiment, each of the permanent magnets 210 includes a neodymium-iron-boron alloy; and the poles 220 include vanadium steel, iron, cobalt or the alloys thereof. The cross section of the longitudinal passage P can be circular or elliptical.

The helical permanent magnet structure 100 of the present disclosure can be applied to an undulator, including but not limited to a free electron laser or a synchrotron radiation accelerator.

Accordingly, for the embodiment as mentioned, the present application provides magnetic fields with higher circularly polarized rate, magnetic strength and uniformity with the helical permanent magnet structure, therefore to enhance the performance of the undulators.

While the invention has been described by means of specific embodiments, numerous modifications and variations could be made thereto by those skilled in the art without departing from the scope and spirit of the invention set forth in the claims.

What is claimed is:

1. A helical permanent magnet structure, comprising:
   at least one magnet assembly, comprising:
      a plurality of permanent magnets with a magnetization direction, the permanent magnets being formed as helical shape and arranged as a helical surface, and the center of the helical surface having a longitudinal passage for being passed through by a charged particle; and
      a plurality of poles with the same amount of the permanent magnets, wherein the poles are magnetized by the permanent magnets and absorb on one side of the permanent magnets; and
      an inner frame surrounding outside and limiting the magnet assembly,
      wherein the magnet assembly further comprises a plurality of positioning members, and the permanent magnets and the poles are positioned in the inner frame.

2. The helical permanent magnet structure of claim 1, wherein the helical permanent magnet structure comprises a plurality of the magnet assemblies, and the magnet assemblies are combined in series to extend the longitudinal passage.

3. The helical permanent magnet structure of claim 1, wherein the helical permanent magnet structure comprises a plurality of the magnet assemblies, and the magnet assemblies are interlaced with each other in a double helix.

4. The helical permanent magnet structure of claim 3, wherein two of the magnetization directions of the magnet assemblies are reverse.

5. The helical permanent magnet structure of claim 1, further comprising:
   a plurality of guiding members fixedly disposed and matched with the shape of the inner frame for allowing the longitudinal movement thereon.

6. The helical permanent magnet structure of claim 1, wherein the permanent magnets comprise a neodymium-iron-boron alloy.

7. The helical permanent magnet structure of claim 1, wherein the poles comprise vanadium steel, iron, cobalt or alloys thereof.

8. The helical permanent magnet structure of claim 1, wherein the cross section of the longitudinal passage is circular or elliptical.

9. The helical permanent magnet structure of claim 1, wherein the number of the permanent magnets is four.

10. An undulator, comprising:

the helical permanent magnet structure of claim 1.

11. The undulator of claim 10, wherein the undulator is a free electron laser or a synchrotron radiation accelerator.

12. The undulator of claim 10, wherein the helical permanent magnet structure comprises a plurality of the magnet assemblies, and the magnet assemblies are combined in series to extend the longitudinal passage.

13. The undulator of claim 10, wherein the helical permanent magnet structure comprises a plurality of the magnet assemblies, and the magnet assemblies are interlaced with each other in a double helix.

14. The undulator of claim 13, wherein two of the magnetization directions of the magnet assemblies are reverse.

* * * * *